United States Patent [19]

Reaser

[11] Patent Number: 5,312,307
[45] Date of Patent: May 17, 1994

[54] DIFFERENTIAL WITH GRADUAL DIRECT CONNECTION

[75] Inventor: Howard W. Reaser, Columbia City, Ind.

[73] Assignee: Dana Corporation, Toledo, Ohio

[21] Appl. No.: 998,334

[22] Filed: Dec. 30, 1992

[51] Int. Cl.⁵ .............................................. F16H 1/445
[52] U.S. Cl. .................................... 475/241; 475/238
[58] Field of Search ................ 475/231, 237, 238–240, 475/241, 249, 250; 192/52, 53 R, 53 B, 93 A

[56] References Cited

U.S. PATENT DOCUMENTS

| | | | |
|---|---|---|---|
| 1,024,595 | 4/1912 | Noyes | 192/53 B |
| 1,173,442 | 2/1916 | Kuhn | 475/237 |
| 1,376,033 | 4/1921 | Pagé | 192/53 B |
| 2,592,695 | 4/1952 | Hindmarch | 192/53 B |
| 3,252,553 | 5/1966 | Peterson | 192/53 B X |
| 3,273,681 | 9/1966 | Seifert | 192/53 B X |
| 3,448,635 | 6/1969 | Nelson | 475/241 X |
| 3,580,371 | 5/1971 | Kron et al. | 192/53 B X |
| 3,841,453 | 10/1974 | Culbertson | 192/93 A X |
| 3,848,717 | 11/1974 | Culbertson | 192/93 A |
| 4,059,026 | 11/1977 | Stritzel | 475/88 |
| 4,344,335 | 8/1982 | Kawai | 475/250 X |
| 4,876,921 | 10/1989 | Yasui et al. | 192/93 A X |
| 5,036,940 | 8/1991 | Takemura | 475/231 X |
| 5,125,876 | 6/1992 | Hirota | 475/238 X |

FOREIGN PATENT DOCUMENTS

| | | | |
|---|---|---|---|
| 4-107347 | 4/1992 | Japan | 475/249 |
| WO90/05250 | 5/1990 | PCT Int'l Appl. | 475/238 |
| 1390076 | 4/1988 | U.S.S.R. | 475/238 |
| 1558719 | 4/1990 | U.S.S.R. | 475/241 |

*Primary Examiner*—Dirk Wright
*Attorney, Agent, or Firm*—Dykema Gossett

[57] ABSTRACT

A system for selective direct connection of a shaft to a differential casing includes a frictional coupling that is engaged prior to direct connection of the shaft to the casing. The frictional coupling ensures that the shaft is rotating at a speed which approximates the speed of the casing prior to direct connection. The frictional coupling thus reduces any jarring from the direct connection of the shaft to the casing, thereby reducing the stress on the system.

13 Claims, 2 Drawing Sheets

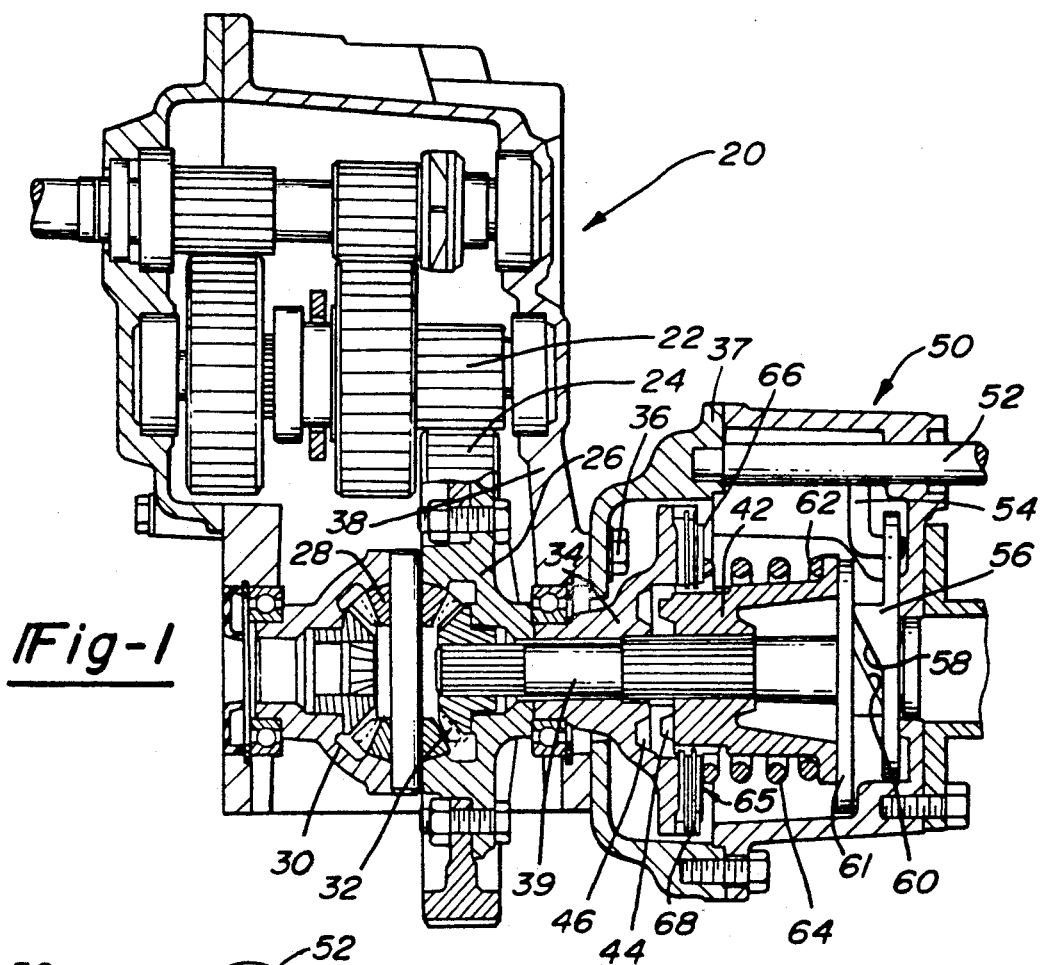
Fig-1
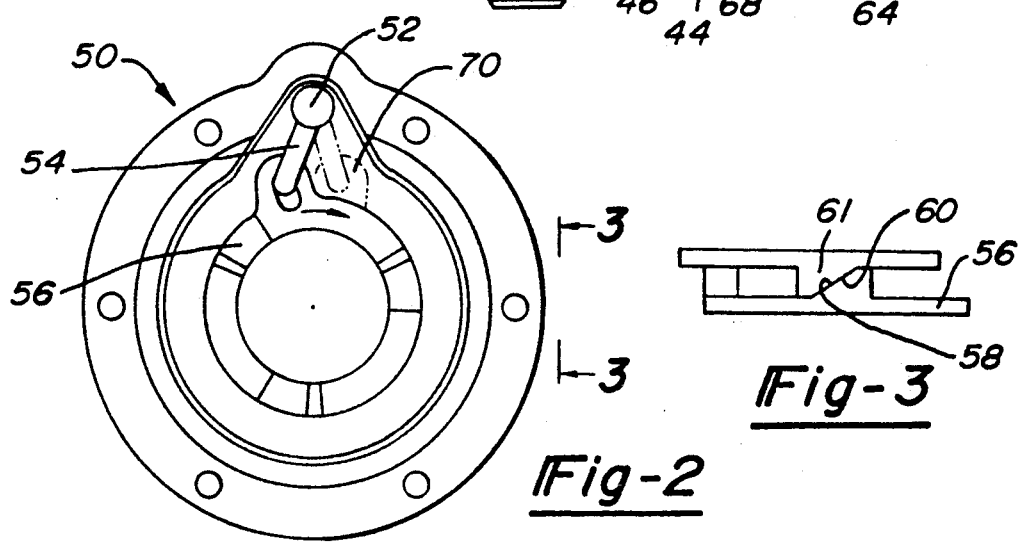
Fig-2
Fig-3

DIFFERENTIAL WITH GRADUAL DIRECT CONNECTION

BACKGROUND OF THE INVENTION

This invention in general relates to a differential wherein a direct drive connection of a driven shaft to a drive input is achieved gradually.

Gear differentials serve to divide a single drive input between driven shafts. Typically they are utilized in vehicles to drive two driven shafts from a single drive input. In some circumstances it is desirable for a driven shaft to rotate at a different speed than the drive input, or the other shaft. Gear differentials allow this differential speed. In other circumstances, however, it is desirable for the driven shafts to be driven at the same speed as the drive input.

Differentials are known wherein the shaft has a coupler which is selectively moved to directly connect the driven shaft with a member driven by the drive input such that the driven shaft is driven at the same speed as the drive input. With such prior art differentials, the direct connection of the driven shaft to the drive input occurs when the two may be rotating at different speeds relative to each other. Such a connection can be jarring, which is undesirable. It would be desirable to provide a smoother direct connection between the driven shaft and the drive input.

SUMMARY OF THE INVENTION

In one disclosed embodiment of the present invention, a differential consists of a driven shaft which has a coupler selectively movable to provide a direct connection between a drive input and the driven shaft. As the coupler is moved to connect the driven shaft and the drive input, a frictional connection is made which gradually brings the driven shaft up to the speed of the drive input prior to direct connection, thereby reducing any jarring connection.

In one embodiment, a pin is rotated to turn cam faces, and cause the coupler to slide towards a position where the shaft is directly connected to the drive input. As the coupler begins to move, a spring carried on the coupler begins to engage a frictional connection between the coupler and the drive input. Thus, the coupler and driven shaft begin to come up to the same speed as the drive input prior to direct connection. In a further feature of the present invention, the drive input is a casing which is driven to drive the gear differential. In another feature of the present invention, the structure for gradually bringing the driven shaft up to the same speed as the casing may be attached to standard differential casings.

These and other features of the present invention will be best understood from the following specification and drawings, of which the following is a brief description.

BRIEF DESCRIPTION OF THE DRAWINGS

FIG. 1 is a cross-sectional view of a differential according to the present invention.

FIG. 2 is an end view of the actuation system of the present invention.

FIG. 3 is a view along line 3—3 as shown in FIG. 2.

DETAILED DESCRIPTION OF A PREFERRED EMBODIMENT

Figure 4:
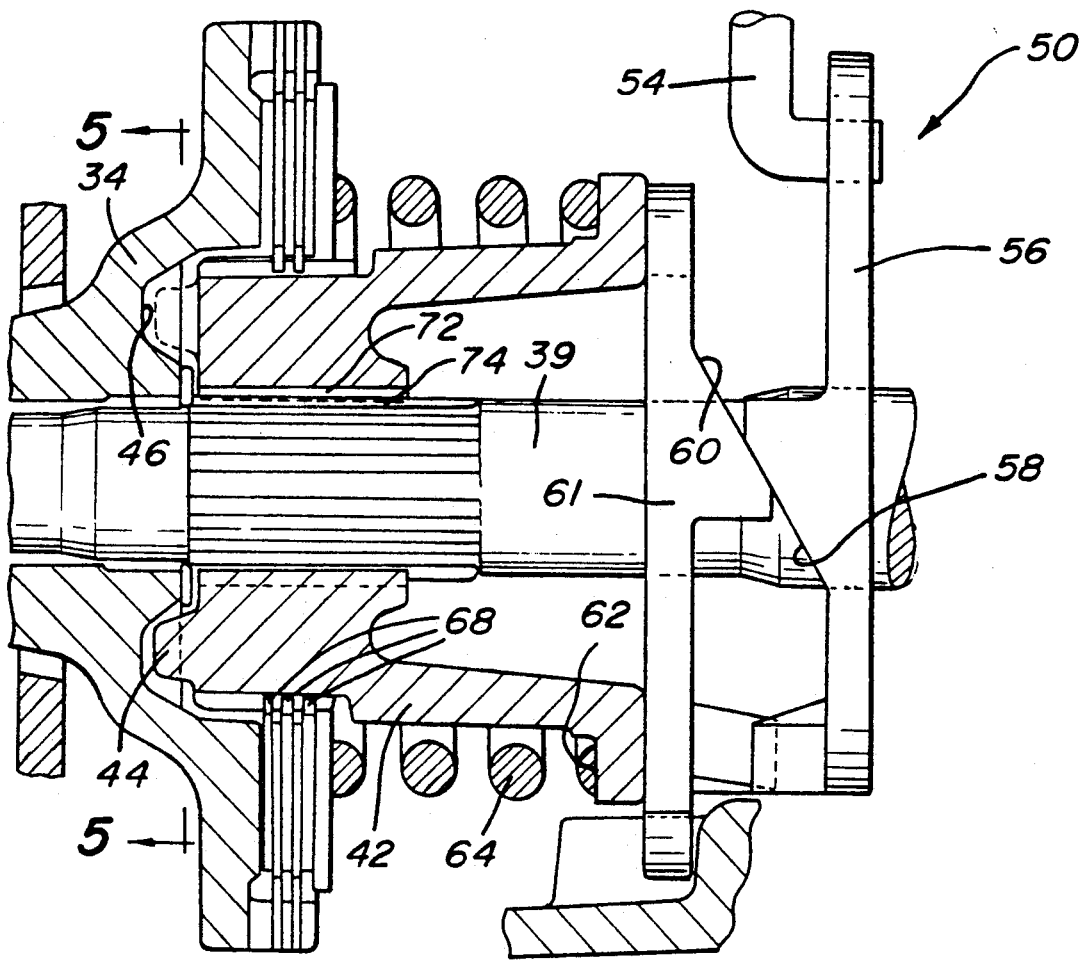
FIG. 4 is an enlarged view of a portion of the differential illustrated in FIG. 1.

FIG. 1 illustrates a gear differential 20 including a drive input 22 which drives a ring gear 24. Ring gear 24 rotates integrally with a gear casing 26. Gear casing 26 drives a bevel gear 28, which drives a pair of opposed side gears 30 and 32. A casing portion 34 is directly attached to casing 26. A bolt 36 connects a housing member 37 to housing 38. In one feature of this invention, the housing member 37 may be connected to standard differential housings 38. In this way, the housing member 37, which houses structure allowing the shaft to be gradually brought up to the same speed as the drive input, may be attached to standard differentials.

A shaft 39 is driven by side gear 32. A coupler 42 is selectively movable to engage shaft 39 for rotation directly with casing portion 34. Teeth 44 on coupler 42 engage in slots 46 in casing portion 34 to provide a sliding dog clutch direct connection.

An actuation system 50 for moving coupler 42 between engaged and disengaged positions includes a pin 52 which is rotatable relative to housing 38. Pin 52 rotates a finger 54, which moves a rotary lever 56 through a limited circumferential extent. Rotary lever 56 includes a cam face 58 which engages a cam face 60 on a sliding member 61. Coupler 42 includes an abutment face 62 which carries a compression spring 64. Compression spring 64 extends between abutment face 62, and a friction coupling 65 which includes disks 66 that rotate with casing portion 34, and mating disks 68 that rotate with coupler 42. Disks 68 and 66 selectively frictionally connect casing portion 34, and therefore drive input 22, to coupler 42, and therefore shaft 39. Spring 64 biases coupler 42 into sliding member 61 such that movement of sliding member 61 is translated into movement of the coupler.

As shown in FIG. 2, pin 52 rotates to move finger 54 through a limited circumferential extent. Finger 54 causes rotary lever 56 to move between the position shown in solid line, to the position 70 shown in phantom. With this movement, cam 58 slides along cam 60, causing sliding member 61 and coupler 42 to move to the left as shown in FIG. 1.

Cam faces 58 and 60 are shown in FIG. 3. As should be understood, upon rotation of rotary lever 56, cam face 58 causes cam face 60 and sliding member 61 to move axially.

As shown in FIG. 4, finger 54 has moved rotary lever 56, and sliding member 61 has moved to the left from the position shown in FIG. 1. Coupler 42 has also moved to the left, and teeth 44 are engaged in slots 46.

Figure 5:
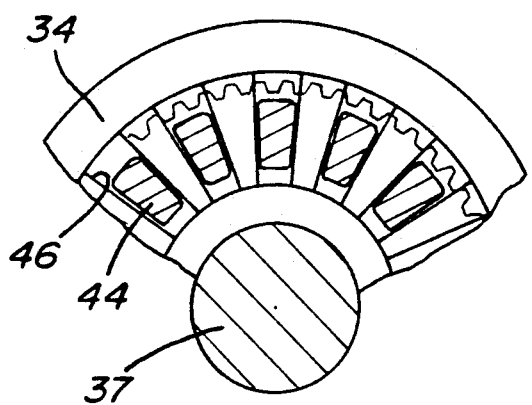
FIG. 5 is a fragmentary sectional view along line 5—5 as shown in FIG. 4.

Coupler 42 includes splines 72 received on splines 74 on shaft 39. Thus, coupler 42 may slide along shaft 39 between engaged and disengaged positions, but will rotate with shaft 39, and selectively drive shaft 39 when engaged. Sliding member 61 is not connected to shaft 39. As shown in FIG. 5, teeth 44 are engaged in slots 46 on casing portion 34. Thus, shaft 39 as shown in FIG. 4 will rotate directly with casing portion 34.

When it is desired to directly connect shaft 39 to casing portion 34, pin 52 is rotated. Coupler 42 will move to the left to engage teeth 44 in slot 46.

As coupler 42 begins to move from the position shown in FIG. 1 to the position shown in FIG. 4, compression spring 64 begins to engage disks 66 and 68. As this frictional connection begins, coupler 42, and thus shaft 39, begin to rotate with casing portion 34 before there is a direct connection between teeth 44 and slots 46. By the time teeth 44 engage slots 46, there is little relative rotation between shaft 39 and casing portion 34. Thus, their final direct connection is less jarring than in prior art assemblies.

To disconnect coupler 42, pin 52 is reversed. Finger 54 and rotary lever 56 are returned to an unactuated position. Spring 64 biases coupler 42 away from friction coupling 65 to allow disks 66 and 68 to come out of frictional contact.

Although a preferred embodiment of the present invention has been disclosed, a worker of ordinary skill in the art would recognize that certain modifications would come within the scope of this invention. Thus, the following claims should be studied in order to determine the true scope and content of this invention.

I claim:

1. A differential comprising:
   a drive source;
   a shaft connected for rotation by said drive source through differential gears such that said shaft is adapted to rotate at different speeds than said drive source;
   a direct connection coupler to directly connect said shaft for rotation with said drive source, said coupler sliding along said shaft and rotating with said shaft; and
   a friction disk coupling to frictionally connect said shaft to said drive source prior to direct connection, said friction disk coupling being actuated by movement of said direct connection coupler, said friction disk coupling including a friction disk having a friction surface generally perpendicular to said shaft, said friction disk being positioned radially outwardly of and being removable from said direct connection coupler.

2. A differential as recited in claim 1, wherein said friction disk coupling includes at least one said friction disk adapted to rotate with said shaft, and at least one said friction disk adapted to rotate with said drive source, a spring interposed between said friction disk coupling and said direct connection coupler, said spring urging said friction disks together for engagement, said spring being compressed when said direct connection means begins to move to directly connect said shaft and said drive source.

3. A differential as recited in claim 1, wherein said direct connection coupler includes a rotary cam which moves said coupler to be directly connected with said drive source, said rotary cam movement providing a force to engage said friction disk coupling.

4. A differential as recited in claim 3, wherein a pin is rotated to turn a rotary lever which supports said rotary cam, to move said direct connection coupler.

5. A differential as recited in claim 4, wherein said pin is connected to a finger, said pin rotation causing said finger to move circumferentially with respect to the axis of rotation of said rotary cam, to turn said rotary lever.

6. A differential as recited in claim 3, wherein said spring is carried on said direct connection coupler.

7. A differential as recited in claim 1, wherein said direct connection coupler includes teeth which selectively engage in slots in said drive source.

8. A differential as recited in claim 1, wherein said drive source is a casing which surrounds a gear differential, said shaft being normally rotated by a gear driven by said casing, and said direct connection coupler connecting said shaft for rotation with said casing.

9. A differential as recited in claim 8, wherein said direct connection coupler includes a plurality of teeth extending along an axis parallel to said shaft, each said tooth selectively engaging a corresponding slot in said drive source.

10. A differential as recited in claim 8, wherein said differential is a bevel gear differential, and said shaft is normally rotated by a side gear.

11. A method for driving a shaft comprising the steps of:
    (1) providing a drive input to a gear differential, connecting a driven shaft to said gear differential, providing a direct connection member which rotates with said driven shaft but is movable relative to said driven shaft, and providing a friction coupling having friction disks positioned radially outwardly of said direct connection coupler;
    (2) driving said driven shaft through said gear differential;
    (3) moving said direct connection member to selectively directly connect said driven shaft for rotation with said drive input;
    (4) frictionally connecting said driven shaft to said drive input as said direct connection member begins to move towards a direct connection with said drive input, such that said driven shaft is gradually driven to the same speed as said drive input prior to direct connection; and
    (5) accessing said friction disk coupling without removal of said direct connection coupler.

12. A differential as recited in claim 4, wherein said rotary lever includes a cam face adapted to slide along a mating cam face associated with said direct connection coupler, such that rotation of said rotary lever causes said direct connection coupler to move axially towards and away from said casing portion, said rotary cam movement compressing said spring to engage said friction disk coupling.

13. A differential comprising:
    a drive source;
    a shaft connected for rotation by said drive source through differential gears such that said shaft is adapted to rotate at different speeds than said drive source;
    a direct connection coupler to directly connect said shaft for rotation with said drive source, said direct connection coupler sliding along said shaft and rotating with said shaft;
    a friction disk coupling to frictionally connect said shaft to said drive source prior to direct connection, said friction disk coupling being actuated by movement of said direct connection coupler;
    a spring means for applying a biasing force on said friction disk coupling; and
    a rotary cam having a cam face adapted to slide along a mating cam face associated with said direct connection coupler, such that rotation of said rotary cam causes said direct connection coupler to move axially towards said drive source, said rotary cam movement simultaneously compressing said spring means to provide said biasing force to engage said friction disk coupling.

* * * * *